United States Patent
Wang (10) Patent No.: US 10,244,690 B2
(45) Date of Patent: Apr. 2, 2019

(54) STRUCTURE OF PLANTING TRAY

(71) Applicant: WANG'S BROTHER PLASTIC CO., LTD., New Taipei (TW)

(72) Inventor: Li Tien Wang, New Taipei (TW)

(73) Assignee: WANG'S BROTHER PLASTIC CO., LTD., New Taipei (TW)

( * ) Notice: Subject to any disclaimer, the term of this patent is extended or adjusted under 35 U.S.C. 154(b) by 172 days.

(21) Appl. No.: 15/350,699

(22) Filed: Nov. 14, 2016

(65) Prior Publication Data

US 2017/0150688 A1   Jun. 1, 2017

(30) Foreign Application Priority Data

Dec. 1, 2015   (TW) .............................. 104219239 U (51) Int. Cl.
*A01G 31/02* (2006.01)
*A01G 9/02* (2018.01)
*A01G 9/029* (2018.01)

(52) U.S. Cl.
CPC .............. *A01G 31/02* (2013.01); *A01G 9/021* (2013.01); *A01G 9/0297* (2018.02); *Y02P 60/216* (2015.11)

(58) Field of Classification Search
CPC ........ A01G 9/028; A01G 27/02; A01G 31/00; A01G 2031/006; A01G 31/02; A01G 9/021; A01G 9/0297
USPC ......... 47/59 R, 62 R, 62 C, 63, 79, 66.5, 86, 47/48.5, 73
See application file for complete search history.

(56) References Cited

U.S. PATENT DOCUMENTS

| | | | | |
|---|---|---|---|---|
| 3,810,329 A | * | 5/1974 | Lecuru ................. | A01G 9/0295 47/87 |
| 4,407,092 A | * | 10/1983 | Ware ..................... | A01G 31/02 47/64 |
| 6,105,309 A | * | 8/2000 | Takayanagi ............ | A01G 31/02 47/62 A |
| 8,051,603 B1 | * | 11/2011 | Jung ...................... | A01G 27/02 47/66.1 |
| 8,291,639 B2 | * | 10/2012 | Gardner .................. | A01G 9/16 47/60 |
| 2012/0036773 A1 | * | 2/2012 | Khoo ..................... | A01G 9/00 47/65.7 |

(Continued)

FOREIGN PATENT DOCUMENTS

| | | | | |
|---|---|---|---|---|
| DE | 102011015124 A1 | * | 9/2012 | ............. A01G 9/021 |
| EP | 2030503 A1 | * | 3/2009 | ............. A01G 31/02 |
| GB | 2433015 A | * | 6/2007 | ............. A01G 9/028 |

*Primary Examiner* — Lisa L Tsang
(74) *Attorney, Agent, or Firm* — Rabin & Berdo, P.C.

(57) ABSTRACT

An internal hollow planting tray is formed by blow molding and made of thermoplastic materials. Multiple planting holes gradually narrowing from top to bottom are evenly distributed on the planting tray, and multiple relatively convex positioning protrusions are set on an inner side of each planting hole for holding around a foam filling member provided to support the planted plants passing through the planting holes. Two relative side concave portions set on an upper edge of each planting hole are provided for fingers to insert to place and take the filling member. Furthermore, two main flow channels are respectively set on two sides of the planting tray. The main flow channel may be respectively communicated with multiple secondary flow channels and minor flow channels as required, to place droppers or provide nutrient solution flowing.

7 Claims, 7 Drawing Sheets

(56) References Cited

U.S. PATENT DOCUMENTS

| | | | |
|---|---|---|---|
| 2012/0266537 A1* | 10/2012 | MacKenzie | E04D 11/002 47/86 |
| 2013/0232872 A1* | 9/2013 | Bryan, III | A01G 31/02 47/62 C |
| 2015/0216131 A1* | 8/2015 | Van Wingerden | A01G 31/02 47/59 R |
| 2016/0037735 A1* | 2/2016 | Blackmore, Jr. | A01G 9/104 47/66.5 |
| 2016/0044874 A1* | 2/2016 | Tsonakis | A01G 9/0295 47/66.5 |
| 2016/0235017 A1* | 8/2016 | Davis | A01G 9/028 |

* cited by examiner

STRUCTURE OF PLANTING TRAY

BACKGROUND OF THE INVENTION

1. Field of the Invention

The present invention relates to an improved structure of a planting tray and, more particularly, to a lightweight, wearable, easy-to-clean, reusable structure of a planting tray.

2. Description of Related Art

With the increasingly serious environmental pollution and attention about food safety issues, various non-polluting organic foods (vegetable, fruit) are gradually popular. However, the global ecological environment accelerated deterioration, there is less and less uncontaminated land, so that cost of soil cultivation of organic vegetables and fruits is high and whole production is limited, it is difficult to meet needs of consumers.

Therefore, indoor cultivation technology provided for adjusting crop growth cycle has been widely developed and mature gradually by using lighting system (LED, halogen lamps) in the recent years; wherein it is more popular that supplying liquid fertilizer in hydroponics or aerosol way.

Equipments commonly applied for hydroponics or aerosol cultivation are mainly setting a planting tray on a predetermined container or channel, multiple planting holes thoroughly set on the planting tray are provided to insert planted plants and let roots of the planted plants extend into the container or the channel, to absorb nutrients in the container or the channel for growth. However, a common planting tray is made of Styrofoam material, which has the following drawbacks in use:

1. Its ingredient Polystyrene cannot be decomposed through the natural environment, wasted materials will harm the ecological environment.

2. Density of material is not high, pores on the surface are larger, scale may be easy remained, so it is hard to clean and cannot be used many times, and its intensity is poor that it may be easily damaged in use, so it is difficult to reduce cost effectively.

In view of the drawbacks of a conventional planting tray, the inventor researched and improved the drawbacks and the present invention is finally generated.

SUMARRY OF THE INVENTION

The object of the present invention is to provide an improved structure of a planting tray, which is mainly an internal hollow planting tray that formed by blow molding and made of plastic materials, multiple planting holes gradually narrow from top to bottom are evenly distributed on the planting tray, multiple relatively convex positioning protrusions are set on an inner side of each planting hole for holding around a foam filling member, the filling member is provided to support the planted plants passing through the planting holes, two relative side concave portions set on an upper edge of each planting hole are provided for fingers to insert to place and take the filling member, the whole structure has an excellent ease of use.

Another object of the present invention is to provide an improved structure of a planting tray, two main flow channels are respectively set on two side of the planting tray, the main flow channel may be respectively communicated with multiple secondary flow channels and minor flow channels as required, to thereby form a structure with a wide range of applications for supplying various nutrient solution, to meet needs of different occasions.

The other object of the present invention is to provide an improved structure of a planting tray, which is mainly an internal hollow tray body that formed by blow molding and made of plastic materials. Therefore, the structure is stronger and it will wear for long-term use. Also, pores on its surface are smaller and less, so that scale does not remain and it is easy to clean, to facilitate reuse and reduce cost of use.

To achieve the object, features of the present invention include: a planting tray set on a predetermined channel component, multiple planting holes gradually narrow from one side to another side are evenly distributed on the planting tray, a foam filling member is placed in each planting hole, multiple relatively convex positioning protrusions are set on an inner side of each planting hole for holding around a foam filling member, so that the planted plants passing through the planting holes may supported by each filling member.

According to the above structure, two relative side concave portions set on an upper edge of each planting hole are provided for fingers to insert to place and take the filling member.

According to the above structure, two main flow channels are concavely set on two sides of the planting tray with a larger internal diameter respectively.

According to the above structure, wherein multiple secondary flow channels are set between the two main flow channels that respectively extended to sides of each planting hole, and each secondary flow channel is respectively communicated with each planting hole through multiple minor flow channels.

According to the above structure, the planting tray is mainly an internal hollow tray body that formed by blow molding and made of thermoplastic materials.

According to the above structure, wherein two engaging grooves are concavely set on two top sides of each channel component respectively, two engaging protrusions are relatively set on two sides of the planting tray with a smaller internal diameter, each engaging protrusion is provided to engage with each engaging groove, so that the planting tray is fixed and positioned on the channel component.

According to the above structure, wherein the side of the planting tray, on which the internal diameter of each planting hole is larger, is a reflective surface, sunshine/photosynthesis of plants may be increased by sunlight reflection, so that plant growth could be accelerated; in the actual implementation, white or light color is used as upper surface of the planting tray for increasing reflective effect, and dark color is used as lower surface of the planting tray for facilitating roots of plant growth.

DETAILED DESCRIPTION OF THE INVENTION

Figure 1:
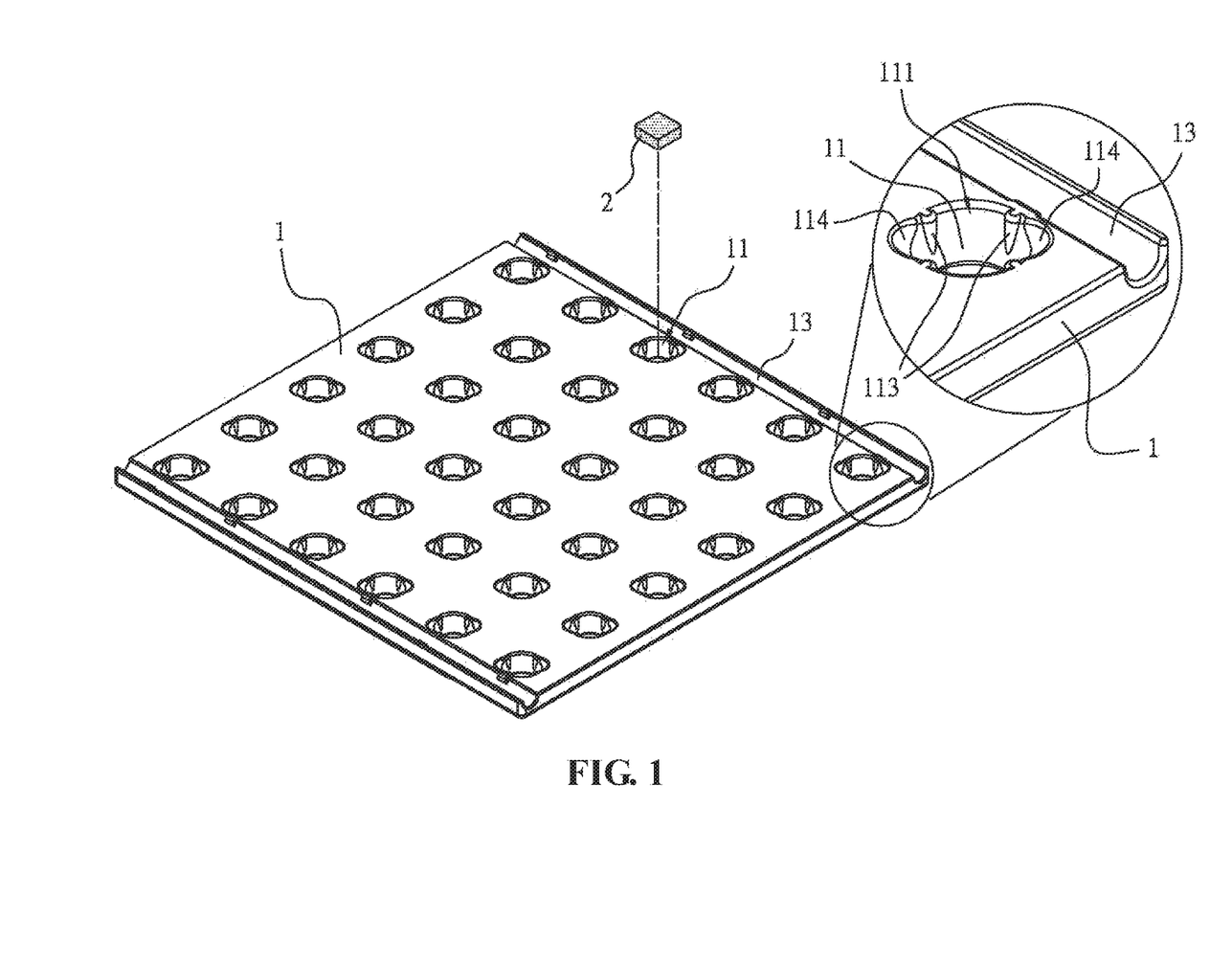
FIG. 1 is a top-view three-dimensional schematic diagram of the first embodiment of the present invention.
Figure 2:
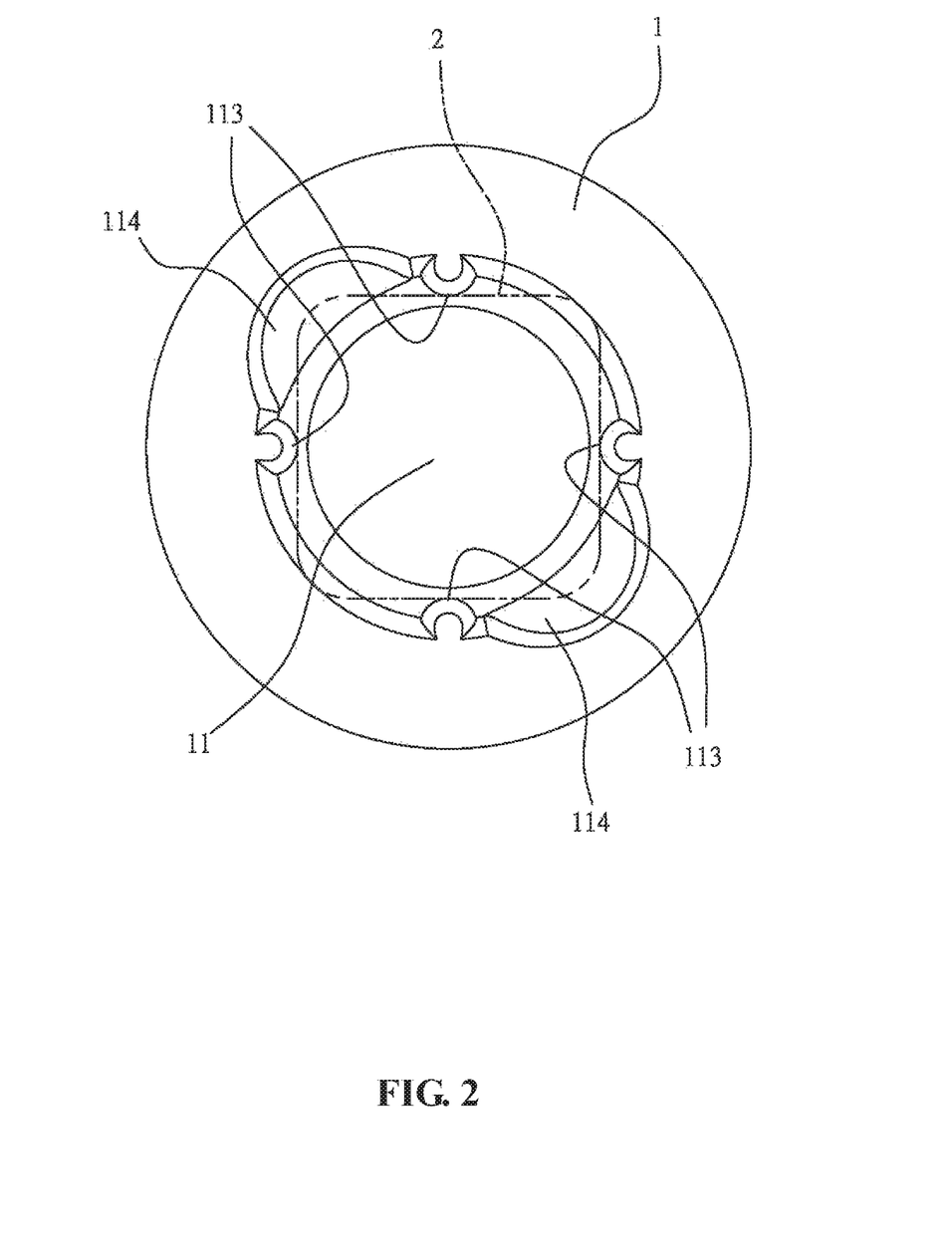
FIG. 2 is a partial enlarged diagram of planting holes of the first embodiment of the present invention.
Figure 3:
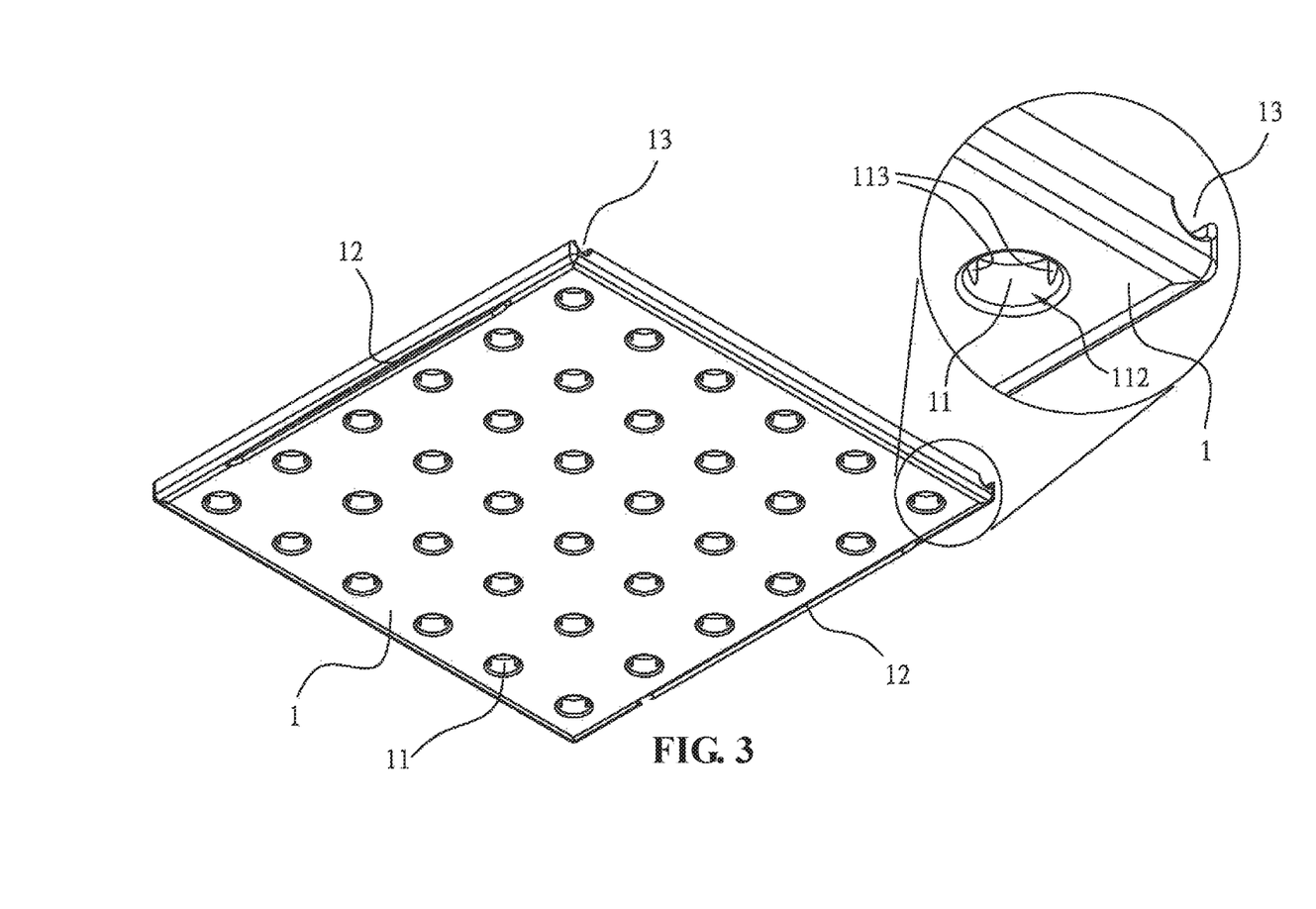
FIG. 3 is a bottom-view three-dimensional structure diagram of the first embodiment of the present invention.

Please refer to FIG. 1 to FIG. 3, the structure of the first embodiment of the present invention mainly includes: an internal hollow planting tray 1 that formed by blow molding and made of thermoplastic materials, multiple planting holes 11 are evenly distributed on the planting tray 1, an expanded opening 111 with a larger internal diameter and a contracted opening 112 with a smaller internal diameter are respectively set on two sides of each planting hole 11, so that the structure of each planting hole 11 is formed as contracted from the expanded opening 111 to the contracted opening 112, multiple relatively convex positioning protrusions 113 are set on an inner side of each planting hole 11, two relative side concave portions 114 are respectively set on edge of each expanded opening 111.

Two main flow channels 13 are respectively set on a surface of the planting tray 1 near the expanded opening 111, two engaging protrusions 12 are relatively set on two sides of the planting tray 1 near the contracted opening 112.

In a practical embodiment, a foam filling member 2 (it could be square shaped) is placed in each planting hole 11, the side concave portions 114 are provided for fingers to insert to place the filling member 2 in the planting hole 11 or take the filling member 2 out of the planting hole 11; when the filling member 2 is placed in the planting hole 11 from the expanded opening 111, because the internal diameter of the contracted opening 112 is smaller, the filling member 2 is prevented from slipping downward, and positioning protrusion 113 are touched peripheral edge of the filling members respectively, so that each filling members 2 is fixedly positioned in the planting hole 11.

Figure 4:
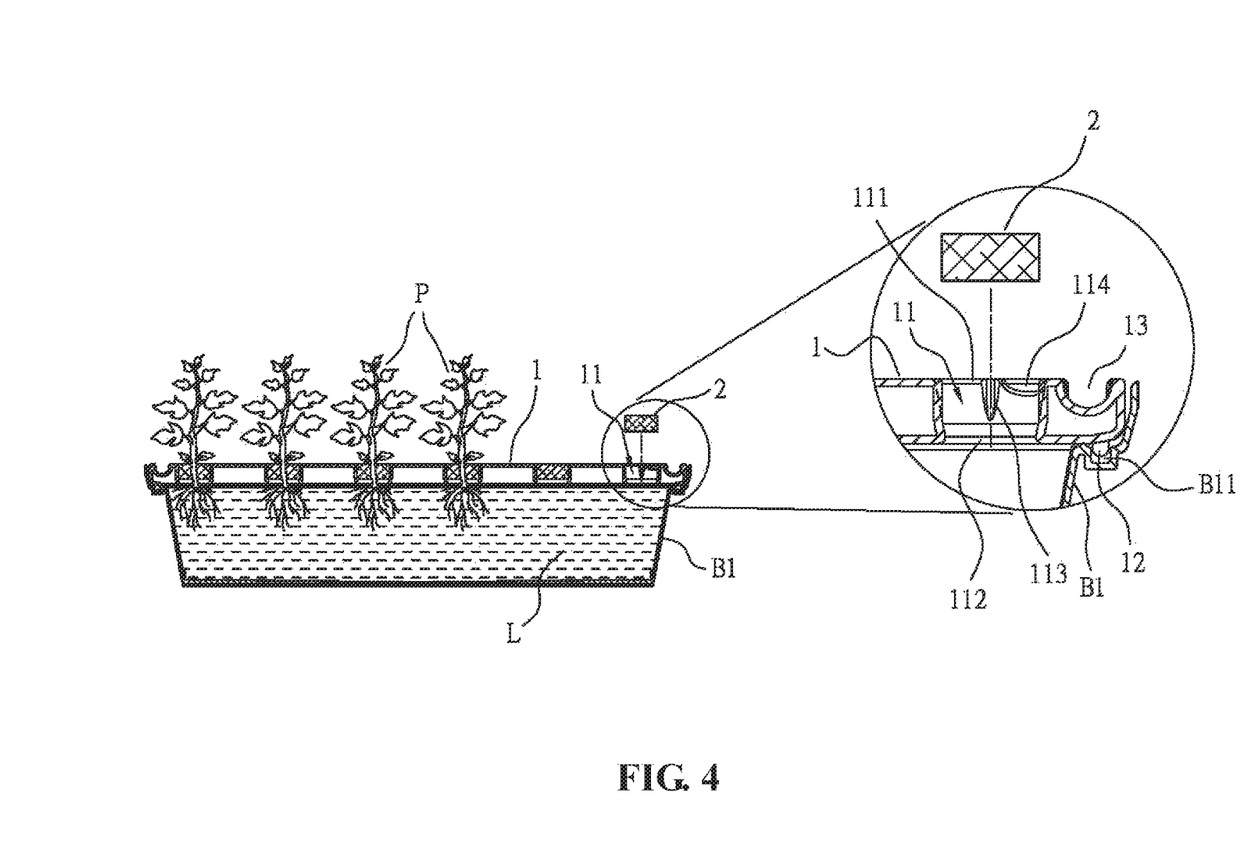
FIG. 4 is a schematic diagram of application of the first embodiment of the present invention.

Please refer to FIG. 4, in practical applications of the first embodiment of the present invention, the planting tray 1 is provided to set on a channel component B1 suitable for hydroponic cultivation, the top of the channel component B1 is open and appropriate amount of nutrient solution L is contained inside it, multiple planted plants P are respectively passed through the planting holes 11, the filling members 2 are used to touch around the planted plants P for supporting, so that each planted plant P could be kept upright and their roots are inserted into nutrient solution L for absorbing nutrients needed for growth; the main flow channels 13 are provided to engage with a main pipeline (not shown) for supplying nutrient solution L, the main pipeline is provided to communicated with each planting hole 11 through other pipeline (not shown) to perform drip irrigation.

In a practical embodiment, two engaging grooves B11 are concavely set on two top sides of each channel component B1 respectively, each engaging groove B11 is provided to engage with each engaging protrusion 12 of the planting tray 1, so that the planting tray 1 is fixed and positioned on the channel component B1.

Figure 5:
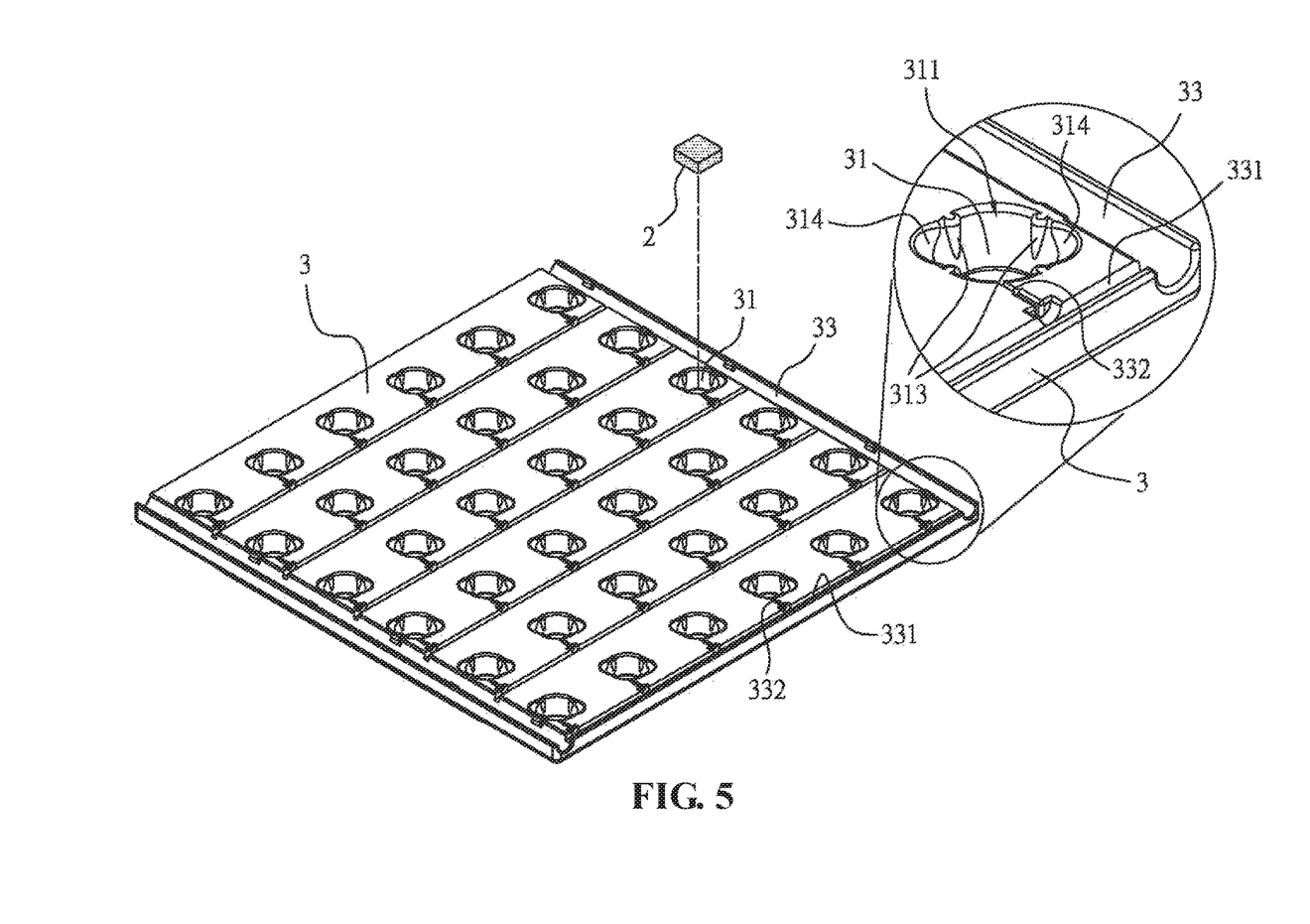
FIG. 5 is a top-view three-dimensional structure diagram of the second embodiment of the present invention.
Figure 6:
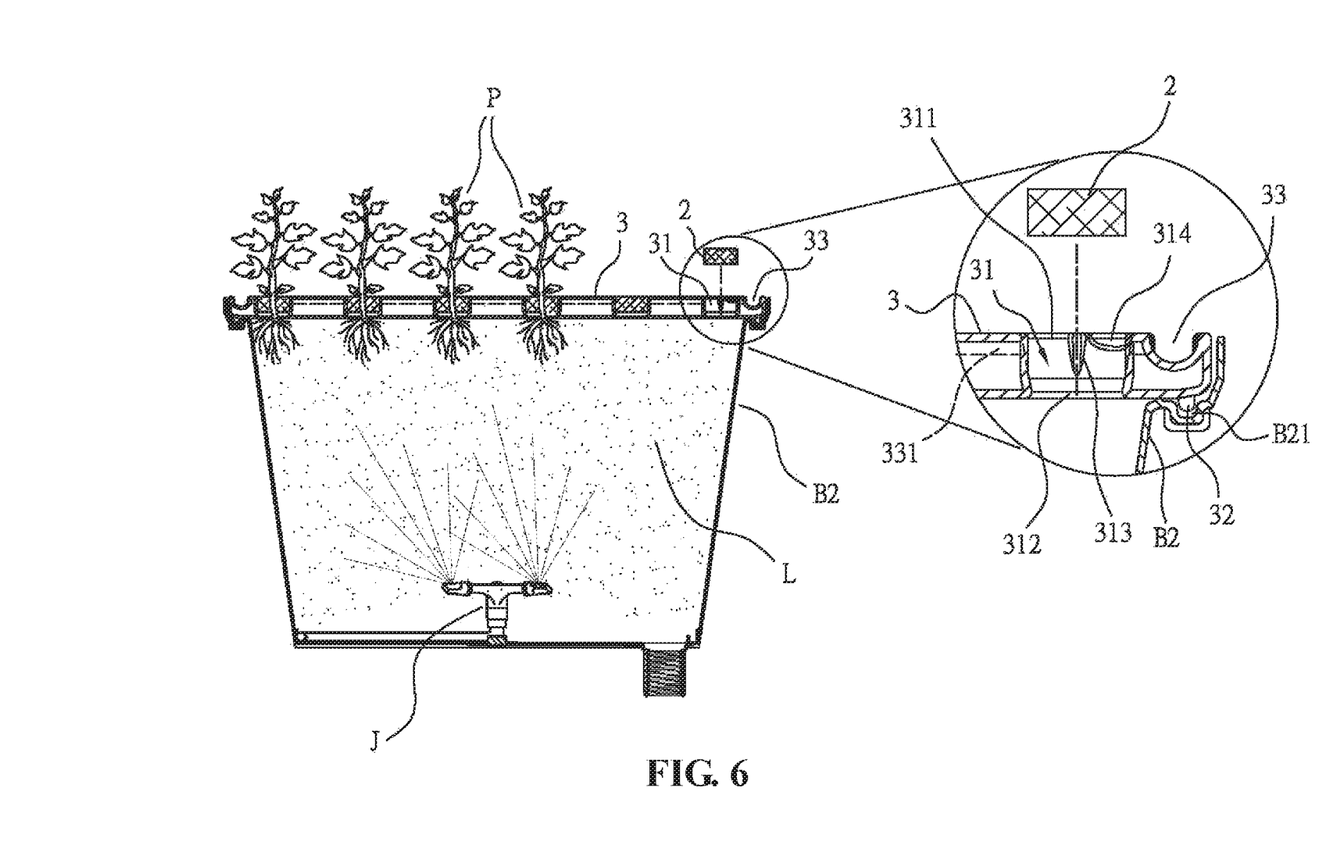
FIG. 6 is a schematic diagram of application of the second embodiment of the present invention.

Please refer to FIG. 5 and FIG. 6, the structure of the second embodiment of the present invention mainly includes: an internal hollow tray 3 that formed by blow molding and made of thermoplastic materials, multiple planting holes 31 are evenly distributed on the planting tray 3, an expanded opening 311 with a larger internal diameter and a contracted opening 312 with a smaller internal diameter are respectively set on two sides of each planting hole 31, so that the structure of each planting hole 31 is formed as contracted from the expanded opening 311 to the contracted opening 312, multiple relatively convex positioning protrusions 313 are set on an inner side of each planting hole 31, each positioning protrusion 313 is touched peripheral edge of the filling member 2 placed in the planting hole 31, two relative side concave portions 314 set on edge of each expanded opening 313 are provided to place and take the filling member 2.

In the planting tray 3, two engaging protrusions 32 are relatively set on two sides of a surface near the contracted opening 312, two main flow channels 33 are respectively set on two side of a surface of the planting tray 1 near the expanded opening 311, multiple parallel secondary flow channels 331 respectively extended to a side of each planting hole 31 are set between the two main flow channels 33, each secondary flow channel 331 could be communicated with each planting hole 31 through multiple minor flow channels 332.

In practical applications, the planting tray 3 is provided to set on a channel component B2, which is suitable for aerosol cultivation and its top is open, multiple planted plants P are respectively passed through the planting holes 31, the filling members 2 are used to touch around the planted plants P for supporting, so that each planted plant P could be kept upright and their roots are inserted into the channel component B2, a spray nozzle J for spraying nutrient solution L is set inside the channel component B2. When nutrient solution L is sprayed in the channel component B2, the planted plants P could absorb enough nutrients by roots; the main flow channels 33, the secondary flow channels 331 and the minor flow channels 332 are provided for nutrient solution L to flow, or for a predetermined dropper element to place, to perform drip irrigation for the planted plants P in the planting holes 31.

In a practical embodiment, two engaging grooves B21 are concavely set on two top sides of each channel component B2 respectively, each engaging groove B21 could be respectively engage with each engaging protrusion 32 of the planting tray 3, so that the planting tray 3 is fixed and positioned on the channel component B2.

Figure 7:
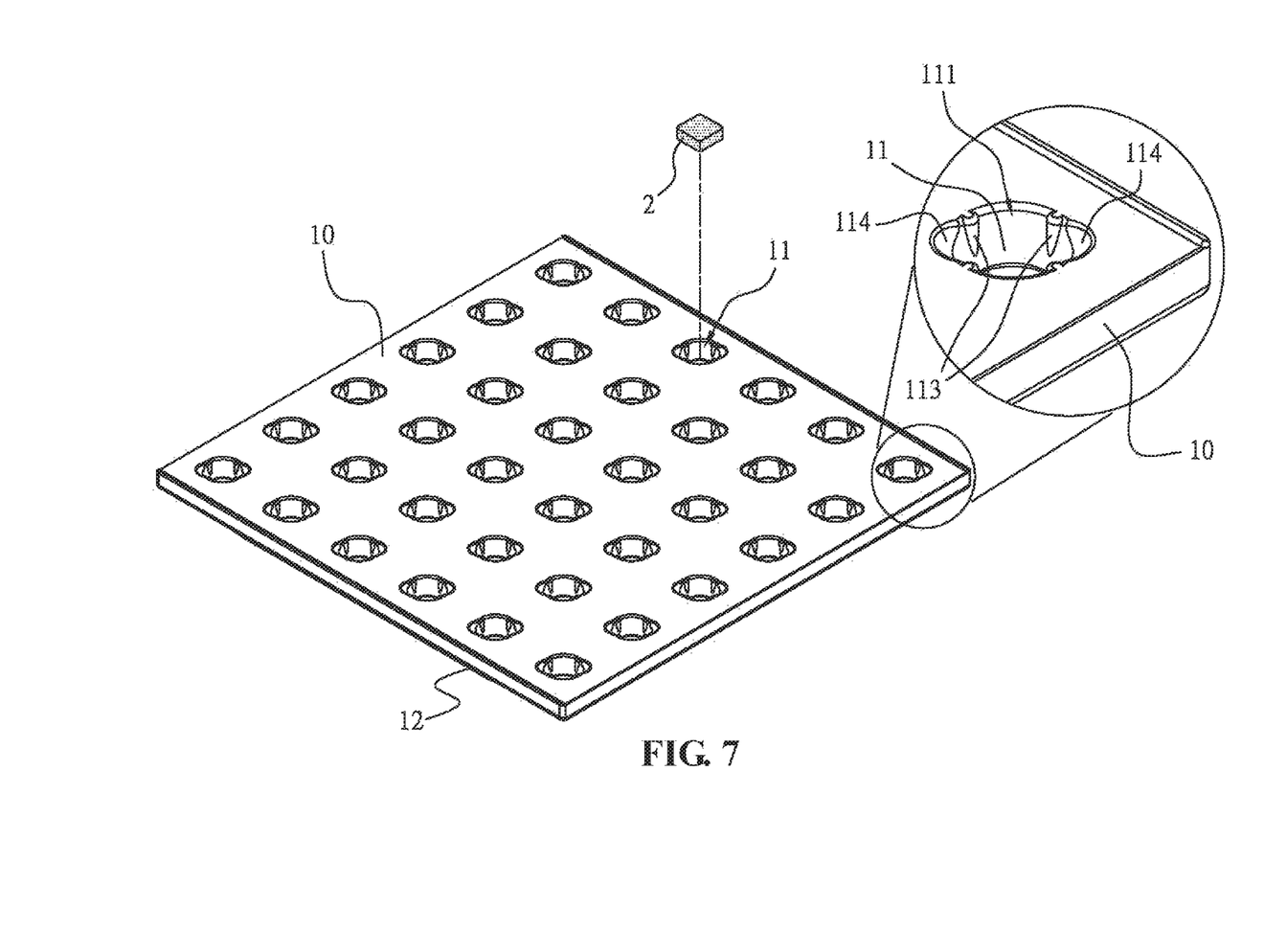
FIG. 7 is a bottom-view three-dimensional structure diagram of the third embodiment of the present invention.

Please refer to FIG. 7, the structure of the third embodiment of the present invention mainly includes: an internal hollow planting tray 10 that formed by blow molding and made of thermoplastic materials, the planting tray 10 includes planting holes 11, positioning protrusions 113, side concave portions 114 and engaging protrusions 12 as same as the above first embodiment, the difference between the planting tray 10 and the planting tray 1 is only that: the planting tray 10 does not include main flow channels 13, so it could provide another choice of hydroponic cultivation similar to the first embodiment.

Above all, the improved structure of the planting tray of the present invention could achieve the purpose of lightweight, wearable, easy-to-clean, reusable effects, so it is an invention with novelty and progress. The above description is only preferred embodiments of the present invention, all of the expanded changes, modifications, alternations or equivalent replacement according to technical means and scope of the present invention should fall within the scope of the present invention.

What is claimed is:

1. An improved structure of a planting tray, including:
   a planting tray set on a channel component; wherein
   multiple planting holes, each having one side and another side, and gradually narrowing from the one side to the other side, are evenly distributed on the planting tray,
   a foam filling member is placed in each of the multiple planting holes, multiple convex positioning protrusions are formed on an inner side of each of the multiple planting holes for holding the foam filling member, so that planted plants passing through each of the multiple planting holes are supported by each foam filling member, for each of the multiple planting holes, an outer perimeter of an opening at the one side has two first diametrically opposed side concave portions and two second diametrically opposed side concave portions, wherein the two first diametrically opposed side concave portions each have a greater degree of curvature than the two second diametrically opposed side concave portions; and wherein each of the multiple convex positioning protrusions separate each of the side concave portions from an adjacent of the side concave portions, and each of the multiple convex positioning protrusions extend inwardly relative to the side concave portions and terminate at a position above a bottom of each of the multiple planting holes.

2. The improved structure of the planting tray as claimed in claim 1, wherein the two side concave portions are provided for fingers to insert to place and take the filling member.

3. The improved structure of the planting tray as claimed in claim 1, wherein two main flow channels are formed respectively on two sides of the planting tray.

4. The improved structure of the planting tray as claimed in claim 3, wherein multiple secondary flow channels are formed between the two main flow channels, the multiple secondary flow channels extending on sides of each of the multiple planting holes, and being communicated with each of the multiple planting holes through multiple minor flow channels.

5. The improved structure of the planting tray as claimed in claim 1, wherein the planting tray includes an internal hollow tray body formed by blow molding and made of thermoplastic materials.

6. The improved structure of the planting tray as claimed in claim 1, wherein the channel component has two top sides, two engaging grooves are respectively formed on the two top sides of the channel component, and two engaging protrusions are formed respectively on two sides of the planting tray, the two engaging protrusions each having a smaller diameter than a diameter of each of the two engaging grooves, the two engaging protrusions being provided to engage respectively with the two engaging grooves, to fix and position the planting tray on the channel component.

7. The improved structure of the planting tray as claimed in claim 1, wherein one side of the planting tray includes a reflective surface.

* * * * *